April 10, 1956  W. E. WARD  2,741,353
POWER PRESSES AND CLUTCHES THEREFOR
Filed Oct. 4, 1954  3 Sheets-Sheet 1

INVENTOR.
WILLIAM E. WARD
BY
Hudson, Boughton, Williams
David & Hoffmann
ATTORNEYS April 10, 1956   W. E. WARD   2,741,353
POWER PRESSES AND CLUTCHES THEREFOR
Filed Oct. 4, 1954   3 Sheets-Sheet 3

INVENTOR.
WILLIAM E. WARD
BY
Hudson, Boughton, Williams
David & Hoffmann
ATTORNEYS United States Patent Office 2,741,353
Patented Apr. 10, 1956

2,741,353

POWER PRESSES AND CLUTCHES THEREFOR

William E. Ward, Shaker Heights, Ohio, assignor to The Cleveland Crane & Engineering Company, Wickliffe, Ohio, a corporation of Ohio Application October 4, 1954, Serial No. 460,212

6 Claims. (Cl. 192—85)

The present invention relates to a new and improved punch press and, more particularly, to a new and improved fluid operated clutch for punch presses and the like. The present case is a continuation-in-part of my copending application Serial No. 213,133, entitled "Power Presses and Clutches Therefor," now abandoned.

The principal object of the invention is the provision of a new and improved punch press and the like having a fluid operated clutch, which clutch is of relatively simple, durable construction, having a low inertia in which a minimum of mass is subjected to rapid acceleration and deceleration and which is attached to the flywheel of the press concentric with the press drive shaft and is operated by fluid directed thereto through a passage in the drive shaft and contained in the clutch by a minimum of sealing members, the clutch being so constructed and arranged that parts thereof subject to wear are readily accessible for repair and/or replacement.

A more specific object of the invention is the provision of a new and improved punch press and the like having a fluid operated friction clutch which can be supported on the drive shaft of the press between the end bearings of the shaft and which is actuated by a cylinder and piston having axial openings through which the drive shaft extends, and which piston is powered by fluid pressure supplied through a bore in the drive shaft opening at the periphery of the shaft between the end wall of the cylinder and the head end of the piston, the fluid being contained between the cylinder end wall and the head end of the piston by a pair of fluid seals, one interposed between the shaft and cylinder wall adjacent to the axial opening in the cylinder and one between the shaft and piston adjacent to the axial opening in the piston, the clutch being so constructed and arranged that the friction elements are readily accessible and easily removable to facilitate replacement.

The invention resides in certain constructions and combinations and arrangements of parts and further objects and advantages will be apparent to those skilled in the art to which it relates from the following description of the preferred embodiment described with reference to the accompanying drawings forming a part of this specification, in which.

Figure 1:
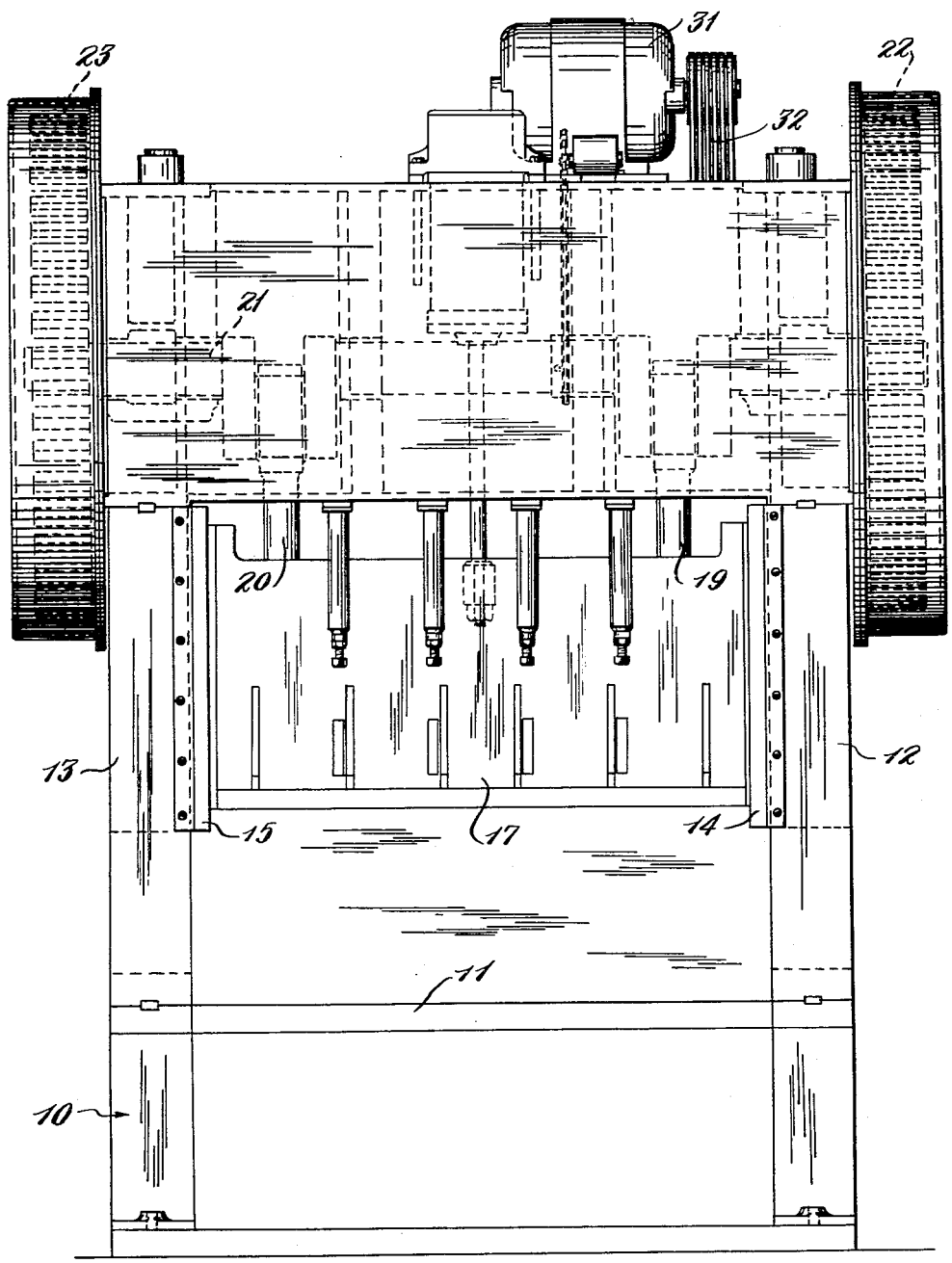
Fig. 1 is a front elevational view of a punch press embodying the invention.
Figure 2:
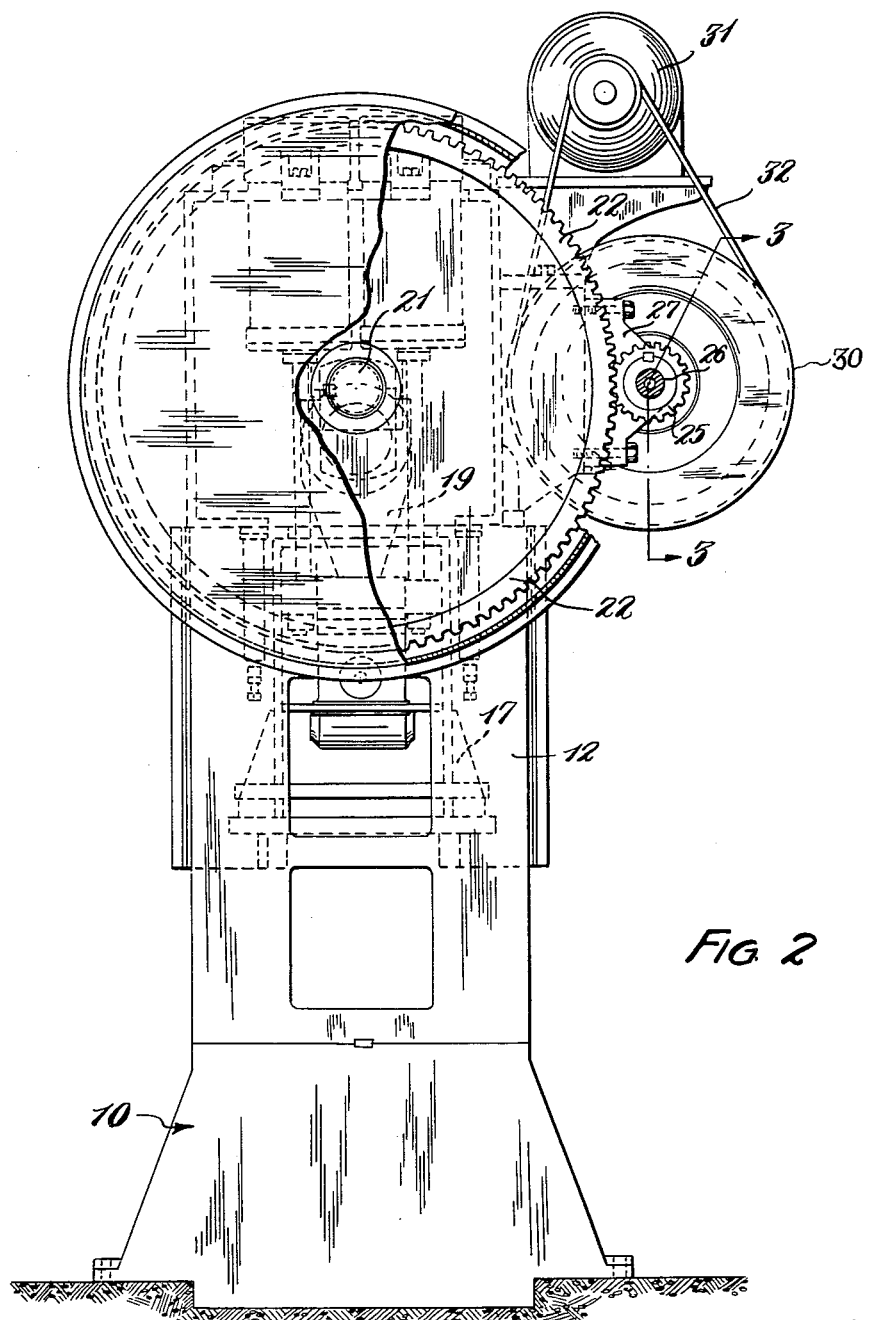
Fig. 2 is a side elevational view of the punch press showing certain parts thereof broken away.

Although the invention can be used in various mechanisms, it is particularly suitable for use in presses having intermittently reciprocable rams or punches, and for the purpose of illustration it is herein shown embodied in a punch press. The punch press comprises a frame 10 including a bed 11 having uprights 12, 13 at opposite sides. The uprights 12, 13 have guideways 14, 15 respectively attached thereto which guide a ram or punch 17 vertically. The ram 17 is reciprocated by pitmans 19, 20 which are attached to the cranks of a shaft 21 journalled in the upper portions of the uprights 12, 13. The crankshaft 21 is driven by two bull gears 22, 23 which are attached to opposite ends thereof.

The bull gears 22, 23 are driven by pinions 25, only one of which is shown, attached to the ends of a drive shaft 26 supported adjacent to its ends by two bearing blocks 27, only one of which is shown, attached to the uprights 12, 13, respectively.

The drive shaft 26 carries a flywheel 30 intermediate the bearings 27, which flywheel is journalled thereon, preferably by suitable spaced antifriction bearings 28 located intermediate the wall of the cylindrical opening and the drive shaft 26 so as to be capable of independently supporting the flywheel in position in the drive shaft 26 and so that the flywheel freely rotates on the shaft. The flywheel is driven by an electric motor 31, which is supported on the upper part of the press frame.

The flywheel 30 is intermittently connected in driving relation with shaft 26 by a fluid clutch indicated generally at C, which clutch comprises a cylinder 34 having a cylindrical piston chamber 35 and an end wall 36 which has an axial opening 37 therethrough through which the drive shaft extends. The drive shaft 26 and the cylinder may have clearance therebetween. A seal 38 is interposed between the shaft 26 and the end wall of the cylinder to form a fluid seal therebetween. The seal 38 preferably comprises a ring of resilient material clamped in a circular cutaway portion of the end wall 36 by a ring 39 secured to the wall by bolts 40, only one of which appears in the drawings, and the inner portion of the ring seal lies along the surface of the shaft. The open end of the cylinder 34 has a radial flange 43 which is provided with a plurality of arcuate projections or blocks 44 which extend outwardly from the face of the flange and which have openings to receive bolts 45 by which the cylinder is attached to the side of the flywheel 30. The projections 44 are equally spaced about the cylinder and they provide spacers for separating the cylinder proper from the flywheel to permit free circulation of air between the cylinder and flywheel. The projections 44 have inwardly facing teeth or splines 47, the purpose of which will appear hereinafter.

A piston 48 reciprocates in the cylinder chamber 35 and the head end 49 of the piston has an axial opening 50 which slidingly receives the shaft 26 and the piston is slidably and rotatably supported relative to the shaft. The drive shaft 26 and the piston 48 may have clearance therebetween. A rotary fluid seal 52 is interposed between the head end of the piston and the shaft to prevent escape of fluid between the shaft and piston end, and the seal preferably comprises a ring of resilient material clamped in a circular undercut portion of the piston adjacent to the opening 50 by a ring 53 which is bolted to the piston end by bolts 54, only one of which appears in the drawings.

The periphery of the head end 49 of the piston is undercut to receive a suitable piston ring 57, which ring may be of any suitable type and is here shown as a flexible ring U-shaped in cross section.

The outer end of the piston 48 has an annular ring formation 60 which presents a smooth annular surface 61 lying in a plane normal to the drive shaft 26, the purpose of which will appear as the description proceeds. The periphery of the ring portion 60 has teeth 62 which mesh with the teeth or splines 47 of the cylinder so that the piston is rotated by the cylinder and it can move axially relative to the cylinder.

Figure 3:
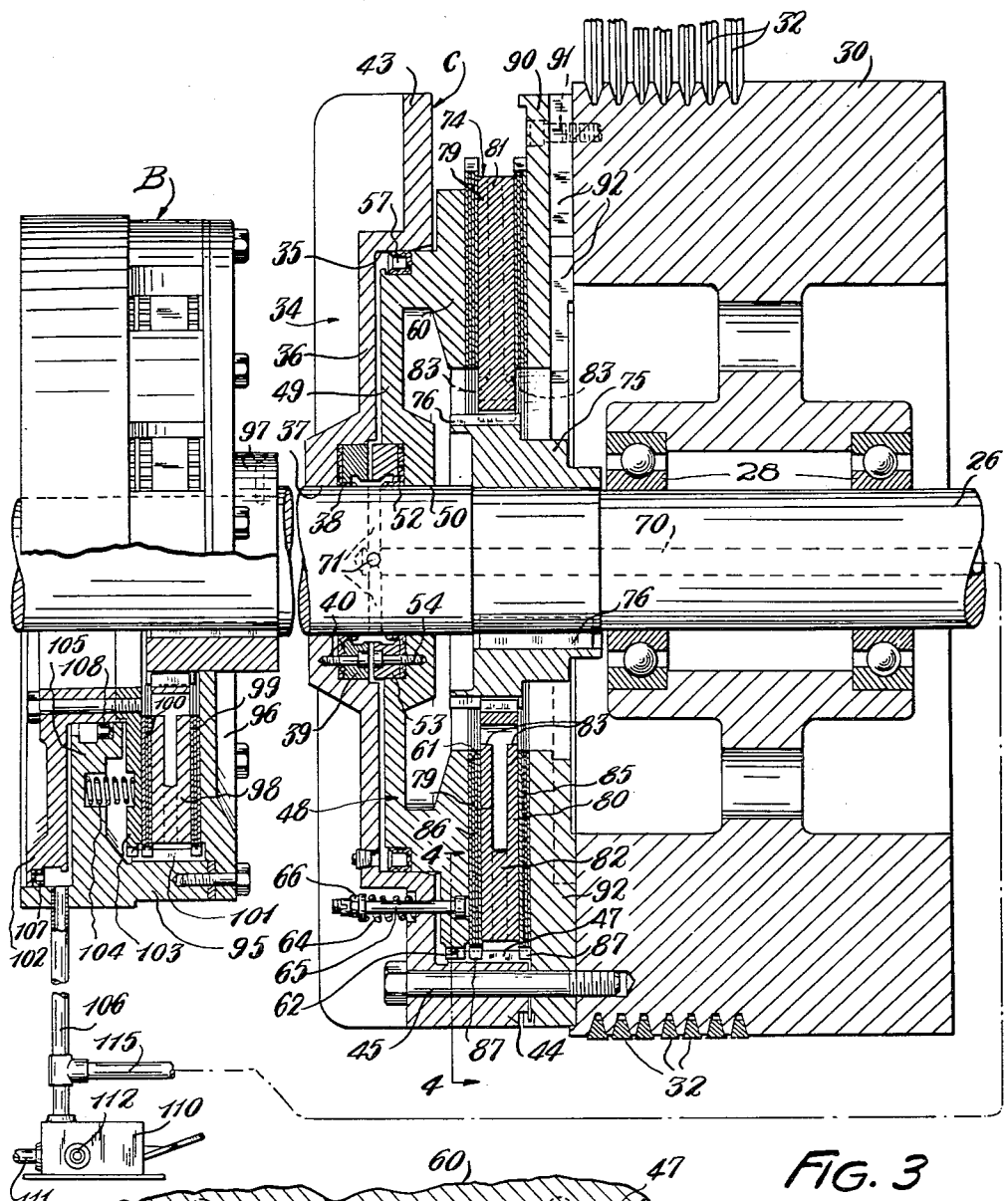
Fig. 3 is a fragmentary sectional view taken substantially along line 3—3 of Fig. 2, but on a larger scale.
Figure 4:
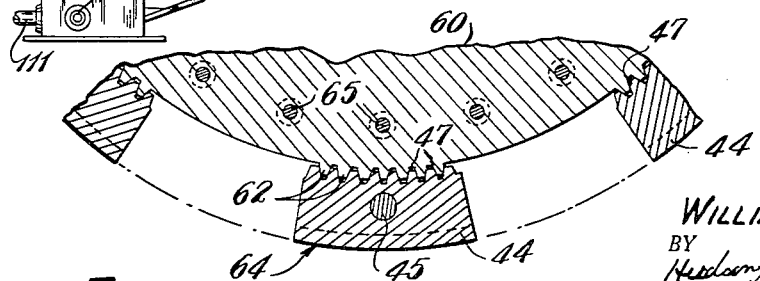
Fig. 4 is a fragmentary sectional view taken substantially along line 4—4 of Fig. 3.

The piston 48 is normally urged toward the end 36 of the cylinder chamber by a plurality of compression springs 64, only one of which appears in the drawings, which are seated in recesses in the outer end of the cylinder and which surround bolts 65 which extend through openings in the ring portion 60 of the piston and the flange 43 of the cylinder member. The bolt heads are recessed in the ring portion and the outer ends have nuts and washers 66 against which the springs 64 press to urge the bolts outwardly to draw the piston to the left as viewed in Fig. 3.

The drive shaft 26 has an axial bore 70 which extends from one end thereof to a point opposite the area between the fluid seals 38, 52, and radial bores 71 extend into the axial bore to form outlets which open into the cylinder chamber between the end wall 36 thereof and the head end 49 of the piston. It will be apparent that fluid under pressure, such as oil or air, directed into the bore 70 will enter the cylinder and move the piston to the right, as viewed in Fig. 3, and will be retained in the cylinder by the seals 38, 52, 57. When the fluid pressure is reduced, springs 64 retract the piston to the left.

The reciprocation of the piston 48 actuates suitable clutching members to clutch the flywheel with the shaft 26, and in the form shown, the clutch includes a center clutch plate 74, having a toothed axial opening supported on a splined hub 75 keyed to shaft 26 by key 76. The teeth of the plate 74 mesh with the splines of the hub so that the plate rotates the shaft 26 through the hub and can move axially thereof. The clutch plate 74 is preferably formed of two spaced annular walls 79, 80 which present smooth outer surfaces and which are separated by radial webs 81, 82. The webs 81, 82 are alternately spaced about the plate and the webs 81 extend from the hub to the outer edge of the plate and webs 82 extend from the periphery of the plate and terminate approximately midway between the periphery and hub of the plate. The plate walls 79, 80 have openings 83 intermediate the webs 81, which openings provide for the circulation of air from the hub of the plate outwardly between the walls and webs 81, 82 to maintain the plate relatively cool.

A pair of suitable clutch disks 85, 86 are on opposite sides of the clutch plate 77 and the disks are preferably formed of annular flat rings having suitable composition facing on opposite sides and having teeth 87 at the periphery thereof which mesh with the teeth or splines 47 of the cylindrical member so that the clutch disks rotate with the cylinder 34 and the flywheel 30 and they can move axially. The clutch disks could be split so that they are in segments which can be removed and replaced from the sides of the shaft 26 when the cylinder 34 is detached and moved from the flywheel along the shaft 26 to a position clear of the elements, the path of movement of the cylinder being preferably unobstructed. Furthermore, the teeth 87 could be omitted and the disks could float. It will be noted that the projections 44 of the cylinder 34 overlie and, in the illustrated embodiment, engage the clutch disks or segments to hold the disks or segments against the action of centrifugal force.

The clutch disk 85 abuts a flat ring-shaped member 90 which is bolted to the side of the flywheel 30 by bolts 91, only one of which appears in the drawings, and the side of the plate 90 facing the flywheel has a series of radial impeller blades 92 formed thereon which causes air to circulate between the flywheel and plate 90 and carry away heat generated by operation of the clutch.

The clutch disk 86 is engaged by the surface 61 of the piston 48 and when the piston is actuated by fluid pressure as described hereinbefore, the force of the piston causes the clutch disks 85, 86 to frictionally grip the clutch plate 74 and thereby drive the shaft 26.

Preferably, a fluid pressure released brake B is provided to brake the drive shaft 26 when the clutch C is disengaged. A brake of any suitable construction may be employed, and in the form shown it comprises an annular cylinder member 95 concentric with shaft 26 and having an end plate 96. A hub 97 is attached to the shaft 26 and extends into the cylinder member 95 and a brake plate 98, which is preferably similar in construction to the center clutch plate described hereinbefore, is splined to the hub and is adapted to move axially relative to the shaft 26 while rotating therewith. The annular friction disks 99, 100 are disposed on opposite sides of the brake plate 98 and in the form shown, the disks have teeth about the periphery thereof which mesh with splines 101 formed about the interior of the cylinder member 95 to prevent rotation thereof. The friction disks 99, 100 could be split so that the segments thereof could be removed and replaced from the sides of the shaft 26, and if desired, the teeth at the periphery thereof could be omitted and the disks permitted to float. The friction disk 100 is normally pressed against the adjacent face of the brake plate 98 and, in turn, urges the plate into frictional engagement with friction disk 99 by an annular piston member 102, which member has a flange 103 which engages the friction disk 100, and the piston is urged against the friction disk by a plurality of springs 104 which are interposed between the flange 103 of the piston and an annular wall 105 projecting inwardly from the periphery of the cylinder member 95. The piston member 102 is adapted to be moved to the left, as view in Fig. 3, and release the brake plate 98 from frictional engagement from the friction disks 99, 100, by air pressure entering the cylinder through a pipe 106 into the area between the piston and the wall 105 of the cylinder member. Preferably, the piston 102 is undercut about the periphery thereof to provide a seat for a ring seal 107 which prevents escape of air from between the piston and cylinder. The inner annular portion of the wall 105 is also undercut to accommodate a ring seal 108 between the web and the central portion of the piston.

The pipe 106 is connected with a treadle operated fluid valve 110 which is accessible to the operator of the press, and the inlet of which is connected by a pipe 111 with a suitable source of fluid pressure, not shown. Normally, the valve 110 is in a position to exhaust pipe 106 to a sump or the atmosphere through port 112, and when the treadle is depressed the valve is operated to connect pipe 106 with the fluid pressure supply through pipe 111.

A pipe 115 is connected at one end to pipe 106 and the opposite end is connected to the end of shaft 26 and with the bore 70 through a suitable rotary seal mechanism, not shown.

It will be seen that by depressing the treadle of the valve 110, fluid pressure is directed into the clutch C to drivingly connect the flywheel 30 with the shaft 26 and at the same time fluid pressure is directed into the brake B to release the shaft 26. When the treadle of valve 110 is released, the clutch and brake are exhausted, causing the clutch to disengage the flywheel from the shaft 26 and to cause springs 104 to apply a braking force to the shaft 26 by pressing flange 103 against the friction disk 99, as described.

It will be apparent that the objects enumerated, as well as others, have been attained and that there is provided a new and improved press mechanism and fluid operated clutch which can be attached to the flywheels of presses without special construction of the flywheels, and which can receive the operating fluid pressure from a bore in the drive shaft through a minimum of reliable sealing means which reduces the chances of leaks to a minimum and provides low cost construction and maintenance. In this connection, it will be noted that when the clutch is disengaged, the seals 38, 52 are under no pressure and lightly engage the shaft 26, and when the seals are under pressure to cause the clutch to engage, the seals then rotate with the shaft. Thus, the seals are subjected to practically no wear and consequently last indefinitely. The clutch is so constructed and arranged that access may be had to the interiors of the clutch and brake mechanisms to replace the clutch disks 85, 86 and the friction disks 99, 100. In the case of the clutch, the cylinder 34 is merely unbolted and moved axially from the flywheel along the drive shaft 26 and the clutch disks are moved outwardly of the cylinder projection 44. By using split clutch disks, the segments thereof can be removed and replaced from the sides of the shaft. The friction disks 99, 100 are likewise replaceable by moving the end plate 96 of the brake housing.

While the preferred form of the invention has been described in considerable detail, it will be apparent that the invention is not limited to the constructions shown, and it is my intention to cover hereby all adaptations, modifications and changes therein which come within the practice of those skilled in the art to which the invention relates and the scope of the appended claims.

Having thus described my invention, what I claim is:

1. In a press or the like, a drive shaft, a flywheel for driving said shaft, bearing means for rotatably supporting said flywheel in operative position on said shaft, and clutch means to one side of said bearing means concentric with said shaft and axially movable wth respect thereto for connecting said flywheel and said shaft comprising driving and driven clutch elements coaxial with said shaft, a friction plate coaxial with and axially movable with respect to said drive shaft intermediate said driving and driven elements, a cylinder member including a piston chamber having a central opening through which said shaft extends, said member forming an enclosure for and overlying the outer periphery of said plate and being concentric with said shaft and axially movable with respect thereto to a position clear of said plate to uncover and permit free access thereto, means permitting relative axial movement between said friction plate and said cylinder member connecting the outer periphery of said plate to said cylinder member for rotation of said plate upon rotation of said cylinder member, a piston reciprocable in said piston chamber for actuating said clutch means and having a central opening through which said shaft extends, means detachably connecting said cylinder member to said flywheel whereby said cylinder member may be detached from said flywheel and moved to said position while maintaining said bearing means intact, the path of movement of said cylinder member to said position to uncover said plate being substantially unobstructed, said shaft having a bore therein opening between said piston and a wall of said piston chamber through which fluid is directed into said chamber.

2. In a press or the like, a drive shaft, a flywheel for driving said shaft, bearing means for rotatably supporting said flywheel in operative position on said shaft, and clutch means to one side of said bearing means concentric with said shaft and axially movable with respect thereto for connecting said flywheel and said shaft comprising driving and driven clutch elements coaxial with said shaft, a friction plate comprised of a plurality of segments coaxial with said shaft intermediate said driving elements, said segments being removable by movement along a path transverse to said shaft, a cylinder member including a piston chamber having a central opening through which said shaft extends, said member forming an enclosure for and overlying the outer periphery of said plate and being concentric with said shaft and axially movable with respect thereto to a position clear of said plate to uncover and permit free access thereto, means permitting relative axial movement between said friction plate and said cylinder member connecting the outer periphery of said plate to the cylinder member for rotation of said plate upon rotation of said cylinder member, a piston reciprocable in said piston chamber for actuating said clutch means and having a central opening through which said shaft extends, means detachably connecting said cylinder member to said flywheel whereby said cylinder member may be detached from said flywheel and moved to said position while maintaining said bearing means intact, the path of movement of said cylinder member to said position to uncover said plate being substantially unobstructed, said shaft having a bore therein opening between said piston and a wall of said piston chamber through which fluid is directed into said chamber.

3. In a press or the like, a frame, a drive shaft, a flywheel for rotating said drive shaft, bearing means for rotatably supporting said flywheel in operative position on said drive shaft, clutch means coaxial with said drive shaft at one side of said flywheel and to one side of said bearing means for interconnecting said flywheel and said drive shaft, said clutch means comprising cylinder means coaxial with said shaft having a shaft opening therethrough and a piston chamber coaxial with said shaft, means detachably connecting said cylinder means to said flywheel, driving and driven clutch elements coaxial with said shaft and relatively movable therealong and including a friction disk within said cylinder means, said cylinder means being movable axially of said shaft to a position clear of said friction disk, and a piston operable in said piston chamber for moving said friction plate axially of said shaft into engagement with said driving element, said shaft having a bore therein opening between said piston and the wall of said piston chamber through which fluid is directed into said chamber, a first annular sealing member carried by said cylinder member at one side of said bore opening surrounding and engaging said shaft, and a second annular sealing member carried by said piston on the opposite side of said bore opening and surrounding and engaging said shaft.

4. In a press or the like, a drive shaft, a flywheel for driving said drive shaft, bearing means for rotatably supporting said flywheel in operative position on said drive shaft, clutch means concentric with said shaft to one side of said bearing means for interconnecting said flywheel and said shaft comprising driving and driven clutch elements relatively axially movable with respect to and coaxial with said shaft, a friction plate intermediate said driving and driven elements and axially movable with respect to said shaft, a cylinder member including a piston chamber having a central opening through which said shaft extends, said cylinder member forming an enclosure for said plate and being concentric with said shaft and axially movable with respect to said shaft to a position clear of said plate to uncover said plate and permit free access thereto, means permitting relative axial movement between said friction plate and said cylinder member connecting the outer periphery of said plate to said cylinder member for rotation of said plate upon rotation of said cylinder member, a piston reciprocable in said piston chamber for actuating said clutch means and having a central opening through which said shaft extends, and means detachably connecting said cylinder member to said flywheel for rotation therewith whereby said cylinder member may be detached from said flywheel and moved to said position, the path of movement of said cylinder member from said flywheel to said position being substantially unobstructed, said shaft having a bore therein opening between said piston and a wall of said piston chamber through which fluid is directed to said chamber, a first annular sealing member carried by said cylinder member at one side of said bore opening surrounding and engaging said shaft, and a second annular sealing member carried by said piston on the opposite side of said bore opening and surrounding and engaging said shaft.

5. In a press or the like, a frame, a drive shaft, a flywheel for rotating said drive shaft, bearing means for rotatably supporting said flywheel in operative position on said drive shaft, clutch means coaxial with said drive shaft at one side of said flywheel and to one side of said bearing means for interconnecting said flywheel and said drive shaft, said clutch means comprising cylinder means coaxial with said shaft having a shaft opening therethrough and a piston chamber coaxial with said shaft, driving and driven elements coaxial with said shaft including a friction disk within said cylinder means and comprising a plurality of segments, and a piston operable in said piston chamber for moving said friction plate axially of said shaft into engagement with said driving element, and means detachably connecting said cylinder means to said flywheel, said cylinder means being movable along said shaft to a position clear of said friction disk upon detachment from said flywheel, and said shaft having a bore therein opening between said piston and the wall of said piston chamber through which fluid is directed into said chamber, a first annular sealing member carried by said cylinder member at one side of said bore opening surrounding and engaging said shaft, and a second annular sealing member carried by said piston on the opposite side of said bore opening and surrounding and engaging said shaft.

6. In a press or the like, a drive shaft, a flywheel for driving said drive shaft, bearing means for rotatably supporting said flywheel in operative position on said drive shaft, clutch means concentric with said shaft to one side of said bearing means for interconnecting said flywheel and said shaft comprising driving and driven clutch elements relatively axially movable with respect to and coaxial with said shaft, a friction plate comprising a plurality of segments intermediate said driving and driven elements and axially movable with respect to said shaft, a cylinder member including a piston chamber having a central opening through which said shaft extends, said cylinder member forming an enclosure for said plate and being concentric with said shaft and axially movable with respect to said shaft to a position clear of said plate to uncover said plate and permit free access thereto, means permitting relative axial movement between said friction plate and said cylinder member connecting the outer periphery of said plate to the cylinder member for rotation of said plate upon rotation of said cylinder member, a piston reciprocable in said piston chamber for actuating said clutch means and having a central opening through which said shaft extends, and means detachably connecting said cylinder member to said flywheel for rotation therewith whereby said cylinder member may be detached from said flywheel and moved to said position, the path of movement of said cylinder member from said flywheel to said position being substantially unobstructed, said shaft having a bore therein opening between said piston and a wall of said piston chamber through which fluid is directed to said chamber, a first annular sealing member carried by said cylinder member at one side of said bore opening surrounding and engaging said shaft, and a second annular sealing member carried by said piston on the opposite side of said bore opening and surrounding and engaging said shaft.

References Cited in the file of this patent
UNITED STATES PATENTS

| 2,586,617 | Danly | Feb. 19, 1952 |
| 2,656,028 | Johansen | Oct. 20, 1953 |